(12) United States Patent
Juranitch

(10) Patent No.: US 11,759,834 B2
(45) Date of Patent: Sep. 19, 2023

(54) EFFICIENT FIBER MANUFACTURING

(71) Applicant: Plasma Tech Holdings, LLC, Bedford, NH (US)

(72) Inventor: James Charles Juranitch, Fort Lauderdale, FL (US)

(73) Assignee: Plasma Tech Holdings, LLC, Bedford, NH (US)

( * ) Notice: Subject to any disclaimer, the term of this patent is extended or adjusted under 35 U.S.C. 154(b) by 192 days.

(21) Appl. No.: 16/762,282

(22) PCT Filed: Nov. 8, 2018

(86) PCT No.: PCT/US2018/059737
§ 371 (c)(1),
(2) Date: May 7, 2020

(87) PCT Pub. No.: WO2019/094536
PCT Pub. Date: May 16, 2019

(65) Prior Publication Data
US 2020/0353517 A1 Nov. 12, 2020

Related U.S. Application Data

(60) Provisional application No. 62/583,441, filed on Nov. 8, 2017.

(51) Int. Cl.
*B09B 3/29* (2022.01)
*C03B 3/02* (2006.01)
*C03B 5/00* (2006.01)
*C03B 5/02* (2006.01)
*C03B 5/235* (2006.01)
*C03B 5/237* (2006.01)
(Continued)

(52) U.S. Cl.
CPC .................. *B09B 3/29* (2022.01); *B09B 3/40* (2022.01); *C03B 3/023* (2013.01); *C03B 5/005* (2013.01); *C03B 5/021* (2013.01); *C03B 5/237* (2013.01); *C03B 5/2353* (2013.01); *D01D 1/04* (2013.01); *F27D 17/004* (2013.01); *C03B 37/05* (2013.01); *D10B 2101/10* (2013.01)

(58) Field of Classification Search
CPC ..................................................... B09B 3/005
See application file for complete search history.

(56) References Cited

U.S. PATENT DOCUMENTS 3,437,327 A * 4/1969 Day ........................ C03B 5/44
65/346
3,510,289 A * 5/1970 Boivent .................. C03B 3/023
266/190

(Continued)

FOREIGN PATENT DOCUMENTS

WO 2016/102629 A1 6/2019

*Primary Examiner* — Jason Lau
(74) *Attorney, Agent, or Firm* — Dykema Gossett PLLC

(57) ABSTRACT

Various embodiments of the present disclosure can include at least one of a method, apparatus and system for the efficient melting of a feedstock to at least one of a molten and vitrified state to be used in a manufacturing system comprised of: a melter to which the feedstock is provided; and a heat recovery system configured to capture exhaust waste heat produced by the melter, wherein the heat recovery system transfers an energy recovered from the exhaust waste heat to pre-heat the feedstock provided to the melter.

9 Claims, 2 Drawing Sheets

(51) Int. Cl.
*D01D 1/04* (2006.01)
*F27D 17/00* (2006.01)
*B09B 3/40* (2022.01)
*C03B 37/05* (2006.01)

(56) References Cited

U.S. PATENT DOCUMENTS

| | | | | |
|---|---|---|---|---|
| 6,071,116 | A | * | 6/2000 | Philippe ................ F23L 15/045 |
| | | | | 431/11 |
| 6,148,745 | A | * | 11/2000 | Wulfert ..................... F23C 7/06 |
| | | | | 110/264 |
| 2006/0243582 | A1 | | 11/2006 | Hazlebeck |
| 2011/0104628 | A1 | * | 5/2011 | Douxchamps ............ C03B 5/04 |
| | | | | 432/159 |
| 2012/0234264 | A1 | * | 9/2012 | Benz ....................... F01K 17/02 |
| | | | | 123/3 |
| 2016/0320057 | A1 | * | 11/2016 | Jarry ..................... F23L 15/045 |
| 2017/0066672 | A1 | * | 3/2017 | Huber ................... C03B 5/2356 |
| 2018/0065877 | A1 | * | 3/2018 | Faulkinbury ............. C03B 5/44 |

* cited by examiner

EFFICIENT FIBER MANUFACTURING

CROSS-REFERENCE TO RELATED APPLICATIONS

This application is a national stage application of International application no. PCT/US2018/059737, filed 8 Nov. 2018 (the '737 application) and published under International publication no. WO 2019/094536 A1 on 16 May 2019. This application claims the benefit of U.S. provisional application No. 62/583,441, filed 8 Nov. 2017 (the '441 application). The '737 application and the '441 application are both hereby incorporated by reference in their entirety as though fully set forth herein.

FIELD OF THE INVENTION

Embodiments of the present disclosure relate generally to a method, apparatus and system for the efficient melting of a feedstock to a molten or vitrified state to be used in a manufacturing system.

BACKGROUND

When a feedstock is heated to a molten or vitrified state, significant energy is required. As energy costs continue to increase, industries such as the fiber manufacturing industry continue to implement more methods to reduce energy consumption. Conventional fuels for melters such as metallurgical coke are becoming cost prohibitive in today's market. Coke's high operational expenditure (e.g., cost) (OPEX) relates to its high cost per British thermal unit (BTU) which can be penalized further if emission attenuation is required after the coke has been oxidized. The high OPEX associated with a modern coke melter has led many fiber manufactures to consider electric, natural gas, and plasma furnaces. These modern furnaces have provided an opportunity to enhance relatively old industries such as the fiber manufacturing industry with new energy and resource saving methods and systems.

BRIEF SUMMARY

Various embodiments of the present disclosure can include a system for the efficient melting of a feedstock to at least one of a molten and vitrified state to be used in a manufacturing system. The system can include a melter to which the feedstock is provided. The system can include a heat recovery system configured to capture exhaust waste heat produced by the melter, wherein the heat recovery system transfers an energy recovered from the exhaust waste heat to pre-heat the feedstock provided to the melter.

Various embodiments of the present disclosure can include a system for the efficient melting of a feedstock to at least one of a molten and vitrified state to be used in a manufacturing system. The system can include a melter to which the feedstock is provided. The system can include a heat recovery system configured to capture exhaust waste heat produced by the melter, wherein the heat recovery system transfers an energy recovered from the exhaust waste heat to pre-heat the feedstock provided to the melter. The system can include a melter surface heat recovery system, wherein the melter surface heat recovery system is configured to recycle surface heat produced by the melter via the melter surface heat recovery system, and transfer the surface heat to at least one of an oxidant being provided to the melter via an air preheater and a feed that is being provide to the melter via a feed preheater.

Various embodiments of the present disclosure can include system for the efficient melting of a feedstock to at least one of a molten and vitrified state to be used in a manufacturing system. The system can include a melter to which the feedstock is provided. The system can include a heat recovery system configured to capture exhaust waste heat produced by the melter, wherein the heat recovery system transfers an energy recovered from the exhaust waste heat to pre-heat the feedstock provided to the melter. The system can include a melter surface heat recovery system, wherein the melter surface heat recovery system is configured to recycle surface heat produced by the melter via the melter surface heat recovery system, and transfer the surface heat to an oxidant supply being provided to the melter via an oxidant preheater.

Various embodiments of the present disclosure can include a system for the efficient melting of a feedstock to at least one of a molten and vitrified state to be used in a manufacturing system. The system can include a melter to which the feedstock is provided. The system can include a heat recovery system configured to capture exhaust waste heat produced by the melter, wherein the heat recovery system transfers an energy recovered from the exhaust waste heat to pre-heat the feedstock provided to the melter. The system can include a melter surface heat recovery system, wherein the melter surface heat recovery system is configured to recycle surface heat produced by the melter via the melter surface heat recovery system, and transfer the surface heat to oxidant supply being provided to the melter via an oxidant preheater; and a fuel supply being provided to the melter via a fuel preheater.

DETAILED DESCRIPTION

Embodiments of the present disclosure relate generally to a method, apparatus and system for the efficient melting of a feedstock to a molten or vitrified state to be used in a manufacturing system. The melter can be a conventional natural gas melter, an electric melter, or a plasma melter with or without a metal bath which may or may not be inductively heated. The feedstock may be used in a fiber manufacturing process such as in the production of stone wool or fiberglass. If a high temperature melter, such as an electric or plasma melter, is utilized, additional resource conservation can be implemented such as the re-melting and recycling of scrap fiber or "shots" as they are known in the industry. Typically, these material resources in the fiber industry are currently disposed of in landfills. The recycling of this waste material adds to the efficiency of the overall fiber manufacturing process. In the lower temperature fiber markets, such as the fiberglass manufacturing industry, the higher temperature melters are desired since they allow the melting or vitrifying of poorer quality feedstock. This poorer quality feedstock, or "Cullet," is significantly cheaper than the now typically employed highly sorted low temperature cullet. With the advent of the higher temperature melters, such as the electric or plasma based melters, or the higher energy exhaust gas flow melters, such as natural gas melters, methods of integrating heat recovery to improve manufacturing efficiency have become more critical. Fortunately, toxic emissions such as the Dioxins and Furans found in Municipal Solid waste heating and oxidation are not found in the fiber feedstock heating and vitrification. This allows for a much simpler and effective heat recovery method, apparatus and system.

Figure 1:
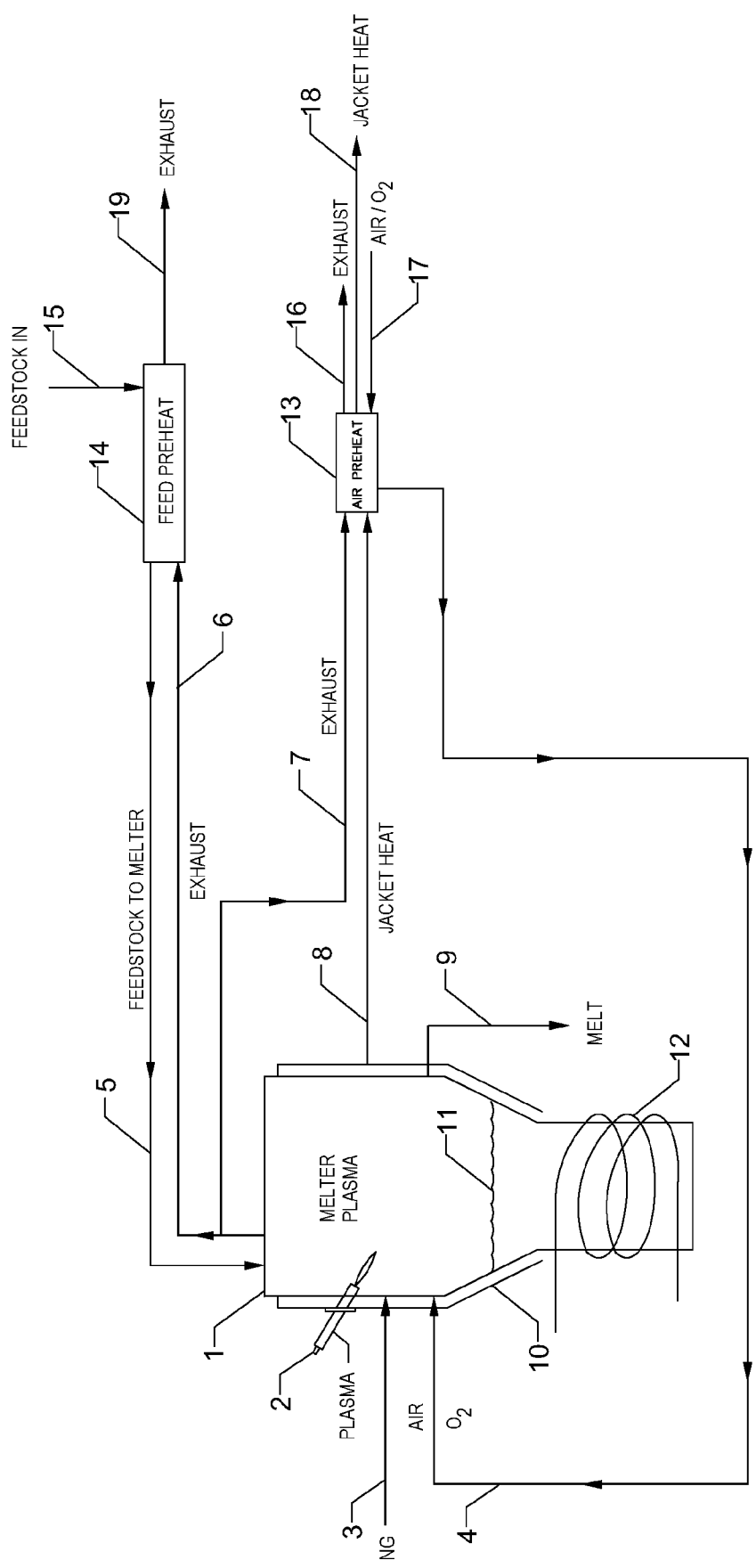
FIG. 1 depicts a plasma based melter and energy recovery system, method, and apparatus that is in accordance with embodiments of the present disclosure.

FIG. 1 depicts a plasma based melter and energy recovery system, method, and apparatus that is in accordance with embodiments of the present disclosure. FIG. 1 shows a plasma based melter 1. The plasma based melter has a plasma source shown as plasma torch 2, which in some embodiments can include a number of torches. In an example, the number of torches can be in a range from two to twelve torches in some embodiments. In FIG. 1, the plasma torch 2 reacts against the feedstock on the surface of metal pool 11, which can be further augmented in its heat energy from optional inductive coil system 12. An optional accessary carbonaceous fueled heat supplement system shown as natural gas injector 3 can be oxidized by air in oxidant conduit 4, or oxygen enriched air, or pure oxygen. In the plasma melter 1, any cost-effective fuel can be oxidized when delivered through gas injector 3, which could include wood chips, coal, coke, butane, propane, well head gas and many other fuels. It is desirable to exploit plasma's flexibility in supplemental fuel choices to benefit from the changing market costs for different fuel choices. Melt 9 can be produced via the plasma melter 1 and can be formed into a number of products. Some embodiments can include a fiberizing process, which can produce a fiber from the melt. For example, the fiberizing process can include a spinning fiberizer, which can contact the melt 9 and produce a fiber or other product, in some embodiments.

A jacket 10 can be used to concentrate the surface heat of the melter. The surface waste heat of the melter can be recycled through jacket conduit 8 to provide heat to heat exchanger 13 and then exhausted via preheat jacket exhaust conduit 18. In some embodiments, the heat exchanger 13 can pre-heat the oxidant in oxidant conduit 4. Although not depicted, in some embodiments, the surface waste heat of the melter, or a portion thereof, can be transferred to the feed heat exchanger 14 from the jacket conduit 8. For example, in some embodiments, the jacket conduit 8 can be fluidly coupled with both the feed preheater 14 and the heat exchanger 13. In an example, air, oxygen, and/or a mixture of air supplemented with increased levels of oxygen can be provide to the heat exchanger 13 via oxidant inlet conduit 17. In some embodiments, the heat exchanger 13 can be optionally supplemented with waste heat from the melter's exhaust from second exhaust conduit 7, which is then exhausted from preheat exhaust conduit 16. The heat exchanger 13 can be a multistage unit, allowing for the oxidant to be heated, for example, via a first stage that has one of the exhaust heat from the second exhaust conduit 7 or jacket heat from jacket conduit 8 passing through it and a second stage that has the other one of the exhaust heat or the jacket heat passing through it. In some embodiments, the heat exchanger can be a single stage heat exchanger and the exhaust heat and the jacket heat can be blended before entering the single stage heat exchanger. In some embodiments that include a multistage heat exchanger, the multistage heat exchanger can be configured to have multiple flow paths including one to pre-heat the oxidant (shown in FIG. 1) and one to optionally pre-heat the fuel (not shown in FIG. 1).

Fiber feedstock enters the process through feed preheat conduit 15. In some embodiments, exhaust from the plasma melter 1 can be split into a first exhaust conduit 6 and a second exhaust conduit 7, as depicted in FIG. 1. The feedstock absorbs energy from the melter's exhaust flow from the first exhaust conduit 6, which is fluidly coupled with the feed heat exchanger 14. The exhaust flow from the second exhaust conduit 7 can have temperatures as high as 2,800 degrees Fahrenheit (F), 2600 degrees F. or 1,400 degrees F. Exhaust outlet temperatures from feed heat exchanger 14 could be as low as 300 degrees F., or function in a range of 400 to 600 degrees F. In an example, the exhaust flow from the second exhaust conduit 7 can have a temperature in a range from 1,400 to 2,800 degrees F. All individual values and subranges from 1,400 to 2,800 degrees F. are included; for example, the temperature of the exhaust can have a lower limit of 1,400 degrees F., 1,500 degrees F., 1600 degrees F. to an upper limit of 2,600 degrees F. to 2,800 degrees F. Specific examples include an exhaust temperature in a range from 1,400 degrees F. to 2,600 degrees F., 1,500 degrees F. to 2,600 degrees F., 1,500 degrees F. to 2,800 degrees F., 1,600 degrees F. to 2,600 degrees F., and 1,600 degrees F. to 2,800 degrees F. The heated feedstock can enter the melter through feed conduit 5. Examples of the feedstock heater (e.g., feed heat exchanger 14) illustratively used in this embodiment can be rotary heaters made by Baker-Rullman and many other similar suppliers.

Figure 2:
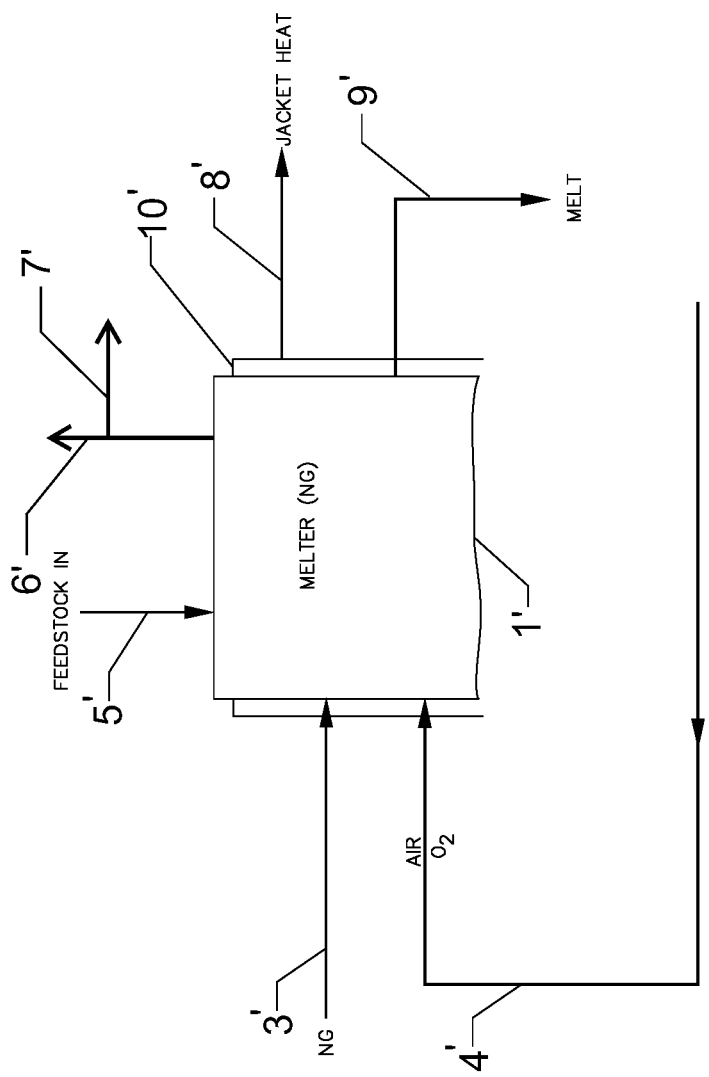
FIG. 2 depicts a natural gas based melter and energy recovery system, method, and apparatus that is in accordance with embodiments of the present disclosure.

FIG. 2 depicts a natural gas based melter and energy recovery system, method, and apparatus that is in accordance with embodiments of the present disclosure. Some embodiments of the present disclosure can include a natural gas melter 1'. For example, in contrast to the embodiments disclosed in FIG. 1, the natural gas melter 1' can be powered by a natural gas injector 3', instead of a plasma torch 2. All other conduits and items shown in FIG. 2 can be the same as those depicted in FIG. 1 and have similar functions. For example, the oxidant conduit 4 depicted in FIG. 1 can be the same as the oxidant conduit 4' depicted in FIG. 2. In some embodiments, natural gas introduced into a chamber of the natural gas melter 1' via natural gas injector 3' can be oxidized by air introduced into the chamber via the oxidant conduit 4'. In some embodiments, a heated feed can be provided to the natural gas melter 1' via a feed conduit 5', which can be heated by a feed preheater (e.g., heat exchanger), as discussed in relation to FIG. 1. For example, a first exhaust conduit 6' can be fluidly coupled to the feed preheater and exhaust gas flowing through the first exhaust conduit 6' can transfer heat to the feed traveling through the feed conduit 5' via the feed preheater. In some embodiments, air, oxygen, and/or a mixture of air supplemented with oxygen in oxidant conduit 4' can be heated via an air preheater (e.g., heat exchanger). In an example, a second exhaust outlet 7' can be fluidly coupled to the air preheater and exhaust gas flowing through the second exhaust conduit 7' can transfer heat to the air, oxygen, and/or mixture of air supplemented with oxygen via the air preheater. In some embodiments, the natural gas melter 1' can include a jacket 10', which can concentrate a heat of the melter 1'. The concentrated heat can be transferred via a jacket conduit 8' to the air preheater and/or feed preheater in some embodiments, as discussed herein. In some embodiments, the natural gas melter 1' can provide for the efficient melting of a feedstock to a molten or vitrified state to be used in a manufacturing system.

EXAMPLES

1. A system for the efficient melting of a feedstock to at least one of a molten and vitrified state to be used in a manufacturing system comprised of:
   a melter to which the feedstock is provided; and
   a heat recovery system configured to capture exhaust waste heat produced by the melter, wherein the heat recovery system transfers an energy recovered from the exhaust waste heat to pre-heat the feedstock provided to the melter.

2. A system for the efficient melting of a feedstock to at least one of a molten and vitrified state to be used in a manufacturing system comprised of:
   a melter to which the feedstock is provided;
   a heat recovery system configured to capture exhaust waste heat produced by the melter, wherein the heat recovery system transfers an energy recovered from the exhaust waste heat to pre-heat the feedstock provided to the melter; and
   a melter surface heat recovery system, wherein the melter surface heat recovery system is configured to recycle surface heat produced by the melter via the melter surface heat recovery system, and transfer the surface heat to at least one of an oxidant being provided to the melter via an air preheater and a feed that is being provide to the melter via a feed preheater.

3. A system for the efficient melting of a feedstock to at least one of a molten and vitrified state to be used in a manufacturing system comprised of:
   a melter to which the feedstock is provided;
   a heat recovery system configured to capture exhaust waste heat produced by the melter, wherein the heat recovery system transfers an energy recovered from the exhaust waste heat to pre-heat the feedstock provided to the melter; and
   a melter surface heat recovery system, wherein the melter surface heat recovery system is configured to recycle surface heat produced by the melter via the melter surface heat recovery system, and transfer the surface heat to an oxidant supply being provided to the melter via an oxidant preheater.

4. A system for the efficient melting of a feedstock to at least one of a molten and vitrified state to be used in a manufacturing system comprised of:
   a melter to which the feedstock is provided;
   a heat recovery system configured to capture exhaust waste heat produced by the melter, wherein the heat recovery system transfers an energy recovered from the exhaust waste heat to pre-heat the feedstock provided to the melter; and
   a melter surface heat recovery system, wherein the melter surface heat recovery system is configured to recycle surface heat produced by the melter via the melter surface heat recovery system, and transfer the surface heat to:
      an oxidant supply being provided to the melter via an oxidant preheater; and
      a fuel supply being provided to the melter via a fuel preheater.

5. The system as in any one of examples 1-4, wherein heat produced by the melter is generated by an oxidant and a carbon based fuel.

6. The system as in any one of examples 1-4, wherein the heat produced by the melter is generated by at least one of plasma, electricity, an oxidant, and a carbon based fuel.

7. The system as in any one of examples 1-6, wherein the melter is at least partially operated on process waste feedstock that includes at least one of stone wool production shots and stone wool production fiber scraps.

8. The system as in any one of examples 1-6, wherein the melter is at least partially operated on process waste feedstock.

9. The system as in any one of examples 1-8, wherein the melter is used in the fiber production industry.

Embodiments are described herein of various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment", or the like, means that a particular feature, structure, or characteristic described in connection with the embodiment(s) is included in at least one embodiment. Thus, appearances of the phrases "in various embodiments," "in some embodiments," "in one embodiment," or "in an embodiment," or the like, in places throughout the specification, are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It will be further appreciated that for conciseness and clarity, spatial terms such as "vertical," "horizontal," "up," and "down" may be used herein with respect to the illustrated embodiments. However, these terms are not intended to be limiting and absolute.

Although at least one embodiment for completions for efficient fiber manufacturing has been described above with a certain degree of particularity, those skilled in the art could make numerous alterations to the disclosed embodiments without departing from the spirit or scope of this disclosure. All directional references (e.g., upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the devices. Joinder references (e.g., affixed, attached, coupled, connected, and the like) are to be construed broadly and can include intermediate members between a connection of elements and relative movement between elements. As such, joinder references do not necessarily infer that two elements are directly connected and in fixed relationship to each other. It is intended that all matter contained in the above description or shown in the accompanying drawings shall be interpreted as illustrative only and not limiting. Changes in detail or structure can be made without departing from the spirit of the disclosure as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed:

1. A system for the efficient melting of a feedstock to at least one of a molten and vitrified state to be used in a manufacturing system comprised of:
   a melter to which the feedstock is provided; and
   a heat recovery system configured to capture exhaust waste heat produced by the melter, wherein the heat recovery system transfers a combination of an energy recovered from the exhaust waste heat and melter surface heat produced by the melter to pre-heat an oxidant supply being provided to the melter, wherein the energy recovered from the exhaust waste heat and the melter surface heat are blended, before entering a heat exchanger.

2. A system for the efficient melting of a feedstock to at least one of a molten and vitrified state to be used in a manufacturing system comprised of:
   a melter to which the feedstock is provided;
   a heat recovery system configured to capture exhaust waste heat produced by the melter, wherein the heat recovery system transfers an energy recovered from the exhaust waste heat to pre-heat the feedstock provided to the melter; and
   a melter surface heat recovery system, wherein the melter surface heat recovery system is configured to recycle surface heat produced by the melter via the melter surface heat recovery system, and transfer a combination of the surface heat and the exhaust waste heat to at least one of an oxidant being provided to the melter via an air preheater and a feed that is being provide to the melter via a feed preheater, wherein the air preheater and the feed preheater each include a heat exchanger and the surface heat and the exhaust waste heat are blended, before entering one of the heat exchangers.

3. A system for the efficient melting of a feedstock to at least one of a molten and vitrified state to be used in a manufacturing system comprised of:
   a melter to which the feedstock is provided;
   a heat recovery system configured to capture exhaust waste heat produced by the melter, wherein the heat recovery system transfers an energy recovered from the exhaust waste heat to pre-heat the feedstock provided to the melter; and
   a melter surface heat recovery system, wherein the melter surface heat recovery system is configured to recycle surface heat produced by the melter via the melter surface heat recovery system, and transfer a combination of the surface heat and the exhaust waste heat to an oxidant supply being provided to the melter via an oxidant preheater, wherein the surface heat and the exhaust heat are transferred to the oxidant supply via a heat exchanger, and wherein the surface heat and the exhaust heat are blended, prior to entering the heat exchanger.

4. A system for the efficient melting of a feedstock to at least one of a molten and vitrified state to be used in a manufacturing system comprised of:
   a melter to which the feedstock is provided;
   a heat recovery system configured to capture exhaust waste heat produced by the melter, wherein the heat recovery system transfers an energy recovered from the exhaust waste heat to pre-heat the feedstock provided to the melter; and
   a melter surface heat recovery system, wherein the melter surface heat recovery system is configured to recycle surface heat produced by the melter via the melter surface heat recovery system, and transfer the surface heat to:
      an oxidant supply being provided to the melter via an oxidant preheater; and
      a fuel being provided to the melter via a fuel preheater, wherein the fuel preheater pre-heats the fuel with a combination of energy recovered from the exhaust waste heat and the surface heat, wherein the oxidant preheater and the fuel preheater are heat exchangers and the exhaust waste heat and the surface heat are blended, prior to entering one of the oxidant preheater and the fuel preheater.

5. The system as in any one of claims 1-4, wherein heat produced by the melter is generated by an oxidant and a carbon based fuel.

6. The system as in any one of claims 1-4, wherein the heat produced by the melter is generated by at least one of plasma, electricity, an oxidant, and a carbon based fuel.

7. The system as in any one of claims 1-4, wherein the melter is at least partially operated on process waste feedstock that includes at least one of stone wool production shots and stone wool production fiber scraps.

8. The system as in any one of claims 1-4, wherein the melter is at least partially operated on process waste feedstock.

9. The system as in any one of claims 1-4, wherein the melter is used in the fiber production industry.

* * * * *